Jan. 22, 1957  H. N. EKLUND  2,778,986
DEVICE FOR TRANSLATING FLUID PRESSURE INTO
AN ELECTRICAL POTENTIAL
Filed Sept. 22, 1954
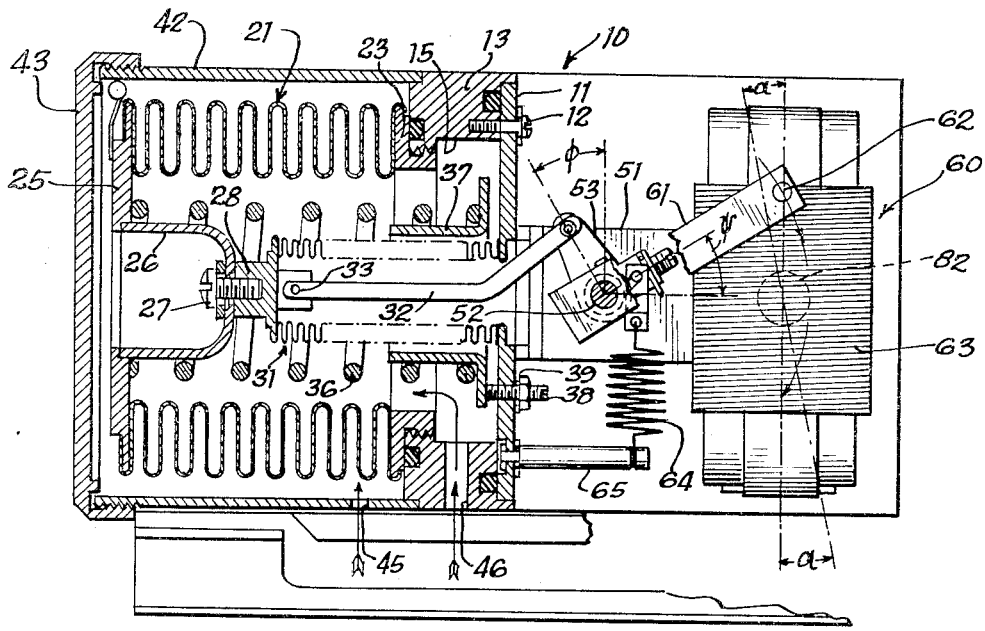
FIG. 1
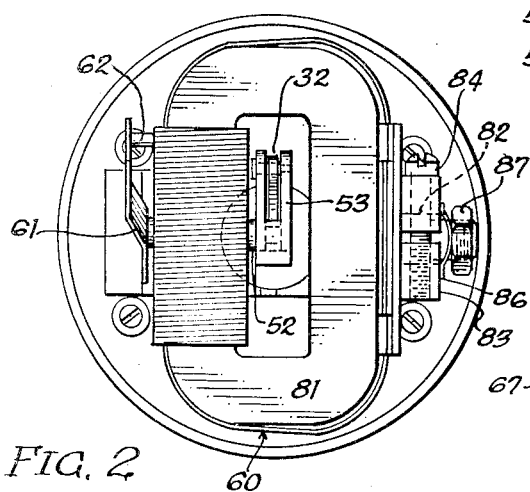
FIG. 2
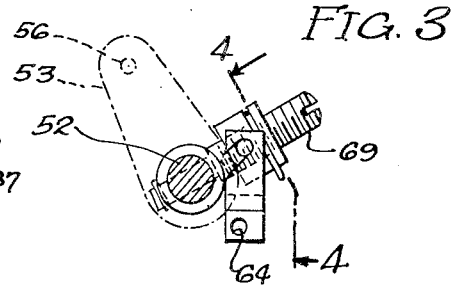
FIG. 3
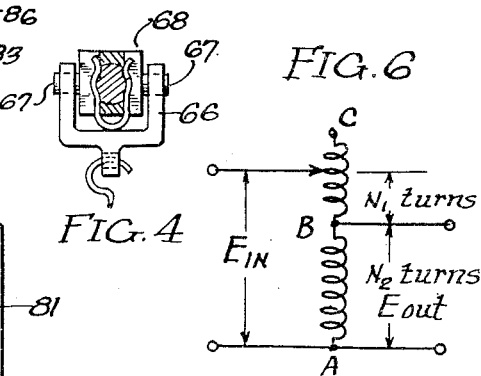
FIG. 4
FIG. 6
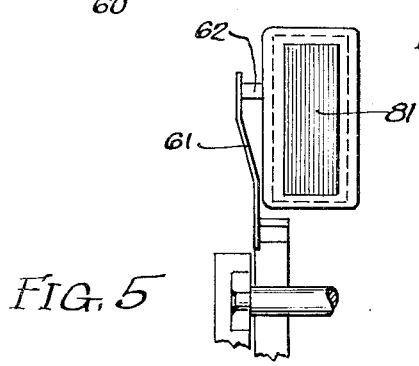
FIG. 5
INVENTOR.
Harry N. Eklund
BY
Leonard S. Shingfield
Atty

United States Patent Office 2,778,986
Patented Jan. 22, 1957

2,778,986

DEVICE FOR TRANSLATING FLUID PRESSURE INTO AN ELECTRICAL POTENTIAL

Harry N. Eklund, Los Angeles, Calif., assignor to Lear, Incorporated, Grand Rapids, Mich., a corporation of Illinois Application September 22, 1954, Serial No. 457,584

3 Claims. (Cl. 323—47)

This invention relates to a device for translating fluid pressure into an electrical potential or variations in such pressure into a varying electrical potential. Specifically, it has relation to a so-called airspeed compensator for measuring the dynamic pressure to which an airplane may be subjected during flight and to provide an electrical potential or a change therein proportional to the dynamic pressure for adjusting an electrical circuit in accordance therewith thereby to control the performance of apparatus dependent for its proper function upon such pressure.

In connection with various apparatus aboard aircraft it often becomes necessary to provide a change in performance in accordance with some function of the change in the dynamic pressure, viz., as a function of the air speed of the craft, as for example, in the case of an automatic pilot operating the control surfaces indirectly through an auxiliary power system, which is relatively unaffected by variations in dynamic pressure. In order to adjust the apparatus for the varying demand placed thereon or the response thereof to an error signal a voltage is derived which is an appropriate function of the air speed and this voltage is injected into a suitable place in the circuit, hence the appellation "airspeed compensator."

It has been determined that, for certain accepted types of aircraft automatic pilots, the gain of the amplifier associated, for example, with a principal control channel, i. e., roll, pitch or yaw, as a function of the prevailing dynamic pressure $q$ can, in general, be represented by a hyperbolic relationship of the form:

$$G = \frac{K}{1+bq} \quad (1)$$

where, $G$ = gain of the amplifier
$b$ = a constant
$q$ = dynamic pressure
$K$ = a constant If the gain is to be made dependent upon the output voltage of a variable autotransformer, for example, as one preferred device for providing a variable voltage, then the ratio of output voltage ($E_o$) to input voltage ($E_i$) is given by:

$$\frac{E_o}{E_i} = \frac{N_2}{N_1+N_2} \quad (2)$$

where, $N_1+N_2$ = total turns, i. e. primary
$N_2$ = output turns, i. e. secondary Hence, if the turns $N_1$ be made to vary as a linear function of the dynamic pressure, viz., $N_1 = kq$ then Equation 2 may be written:

$$\frac{E_o}{E_i} = \frac{N_2}{N_2+kq} \quad (3)$$

$$= \frac{1}{1+\frac{k}{N_2}q} \quad (3a)$$

If, $$\frac{E_o}{E_i}$$

be identified with the gain $G$ of Equation 1 it is seen that an arrangement whereby the effective number of turns of the primary of an autotransformer is made to vary as a linear function of the dynamic pressure will result in a gain characteristic of the same form as is demanded by the autopilot-aircraft combination.

By interposing a variable autotransformer of the type pointed out between a suitable source of alternating current, of constant voltage $E_i$, and the exciting windings of the signal pickoffs of the autopilot, the latter will experience a variation in gain proportional to the secondary voltage $E_o$ impressed on the pickoffs. This variation, by virtue of the arrangement forming the subject matter of this invention, will therefore be controlled by the dynamic pressure.

Accordingly, a principal object of the invention is to provide an electro-mechanical arrangement for translating the dynamic pressure into an electrical potential and such that the pressure variation is capable of being utilized continuously and instantaneously to provide a continuous and instantaneous variation in potential, that is to say, without appreciable mechanical lag.

Another object is to provide a device in accordance with the foregoing which utilizes a minimum of parts and is sufficiently rugged to withstand the vibration encountered aboard aircraft.

A further object lies in providing a device as aforesaid so constructed and arranged as to be rapidly adjustable in order to vary the proportional relation between input in terms of dynamic pressure and output in terms of a voltage, in order to satisfy those applications where departure from the basic hyperbolic relationship is desired.

Other objects will become apparent from the following description which, taken with the accompanying drawing, discloses a preferred form which the invention may assume in practice.

In this drawing:

Fig. 1 shows a longitudinal cross section, with some parts in elevation, of one form of the invention;

Fig. 2 is a right hand end elevational view thereof;

Fig. 3 is a detail to show more clearly certain adjustment features;

Fig. 4 shows a cross section taken on the line 4—4 of Fig. 3;

Fig. 5 illustrates the autotransformer windings; and,

Fig. 6 is a schematic diagram of the autotransformer in its relation to the balance of the circuit.

Broadly regarded, the invention comprehends the provision of a pressure responsive device, for example, a sealed, cylindrical, spring-restrained bellows arranged to be subjected to the sum of the static and dynamic pressures exteriorly thereof and to the static pressure interiorly in order that the net actuating force and therefore the axial extension and retraction of the bellows is a function of the dynamic pressure. Since the actual displacement of the movable end of the bellows is held to a low value such change in axial length may be made practically linearly proportional to the change in pressure. An autotransformer having a section of its primary stripped of insulation and wiped by a suitable brush or contact is provided adjacent the bellows and, by virtue of a linkage connecting the movable end of the bellows determines a concomitant portion of the primary turns.

Such linkage is so arranged as to provide predetermined relationships between the bellows movement and the primary turns, there being novel adjustments for selecting any desired relationship within the working range of the device. Additionally, the physical position of the primary may be varied for any selected adjustment of the linkage further to vary the characteristics for certain applications. In other aspects the invention contemplates variable transformers of other types, e. g., in which the primary turns may remain constant and the secondary turns varied, or in which the primary and secondary are wound on separate cores and the degree of coupling varied, or in which adjustable core transformers are utilized, e. g., E–I types, or in which a variable condenser may serve as the electrical portion of the device.

Turning now to the drawing, I have shown a framework 10 bearing a bracket plate 11 to which is secured by screws 12 an annular member 13 defining, with parts to be described, a chamber 15. An expansible and contractible corrugated, cylindrical bellows 21 of a common type is fixed at one end, as by the termination 23 threadedly engaged with the member 13. The free (i. e. left) end is constituted as an annulus 25 which is secured to a cup 26 in turn attached by a screw 27 to the movable end 28 of a second similar bellows 31 but of much smaller diameter. This latter serves simply as a seal in connection with the link 32 pivotally connected at 33 to the free end thereof. The stiffness of either bellows is unimportant, since it is the total stiffness of the two bellows and the spring 36 which determine the spring rate. However, it is important that the seal bellows be small as the outside of this bellows is subject to pressure from the static line while inside is vented to the interior of the airplane and the pressure in the airplane is not always the same as the static line pressure.

Bellows 21 is restrained by means of a compression spring 36 supported between an adjustable, flanged abutment 37 and the annulus 25. Adjustment is effected by means of screws 38 and locknuts 39.

A casing 42 and threaded cap 43 enclose and protect the bellows 21 which remains subject on its exterior surface to static and dynamic air pressure via an orifice 45 in the casing 42, while the interior thereof is subject to static pressure via a passage 46. It will be understood that a properly positioned Pitot tube or equivalent device will be connected to the orifice 45. Accordingly, variations in dynamic air pressure will be evidenced as displacement of the link 32.

A bracket 51 is fastened to the plate 11 and serves to journal a shaft 52 to which a crank arm 53 is secured and to the free end of which the link 32 is pivotally connected, as at 56. In order to allow angular adjustment of the arm 53 for a purpose to appear, the arm 53 is secured to the shaft by a set screw.

A second arm 61 is similarly secured to the shaft 52 for angular adjustment independently of the arm 53, and carries a brush 62 adapted to wipe on an exposed sector of the winding 63 of an autotransformer 60, and for a purpose shortly to be described.

To provide tension for elimination of undesired backlash a spring 64 is secured to a post 65 at one end and to a hook-like yoke 66 at the other end (Fig. 4). This yoke engages over pins 67—67 extending from a threaded block 68 carried on a screw 69 swivelled in the shaft 52 whereby rotation of the screw will shift the upper end of the spring 64 to vary the effective torque thereof.

By reason of the independently adjustable arms 53 and 69 their angles with respect to the vertical and horizontal, respectively $\phi$ and $\psi$ may be varied over a considerable range whereby to alter the displacement rate of the wiper 62 relative to the linear rate of movement of the link 32. It can be shown that, by making the angles $\phi$ and $\psi$ equal, the travel of the brush, regarded in a direction perpendicular to the turns of the transformer winding, is proportional to the compression of the bellows. By change in either or both of said angles, it is possible to obtain a gain function for the amplifier departing from the basic hyperbolic relation discussed hereinabove.

The transformer shown by way of example comprises a closed core 81 carried on a stud 82 clamped in a fixedly mounted split collar 83 having a screw 84 for closing thereof. Additionally, stud 82 may be equipped with a wave washer 86 and nut 87 to facilitate minute angular adjustment of the transformer about the axis of the stud 82. The single winding 63 of the transformer is so arranged on the core that a portion thereof, namely B—C, of Fig. 6, is on the outside and is stripped of insulation over that portion thereof traversed by the brush 62 in any of the adjusted positions of the linkage intermediate the bellows and brush or any of the angular positions of the transformer.

Further variation of the relationship between bellows movement and the turns tapped by the wiper 62 may be accomplished by tilting the entire transformer on the axis of the stud 82 as measured by an angle $\alpha$ to the right or left. The effect of skewing the winding 63 through an angle $\alpha$ is to increase the rate of gain at one end of the dynamic pressure range and to decrease it at the other, or vice versa, depending upon the direction of the angle of skew. The magnitude of the effect is obviously a function of $\alpha$. Thus, by a combination of the three variables, $\alpha$, $\phi$ and $\psi$, the response of the device may be varied over a considerable range. Moreover, the spacing of the turns B—C may be varied in a non-linear fashion.

Turning to Fig. 6 it will be noted that the turns of the primary section of the transformer winding are varied rather than those comprising the secondary section, as has been customary in variable types of autotransformers known to me. Stated otherwise, $N_2$ remains constant while $N_1+N_2$ is varied, thereby leading to the desired non-linear relation as developed heretofore, as against the linear transformation of prior variable autotransformers utilized in air-speed compensators.

Where, in this description and in the claims, I employ the term "fluid" the same is intended in its broad sense as encompassing both liquids and gases.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

I claim:

1. Apparatus for producing from an input voltage $E_i$ an output voltage $E_0$ which varies with a dynamic fluid pressure $q$ in accordance with the relationship $$\frac{E_o}{E_i} = \frac{K}{1+bq}$$

where $K$ and $b$ are constants, comprising an autotransformer having primary and secondary turns, a wiper in contact with and movable over said primary turns, said input voltage being connected across the primary turns between said wiper and a terminal of said autotransformer, whereby the effective number of primary turns is varied as said wiper is moved, leads connected to the terminals of said secondary turns to derive said output voltage therefrom, a mechanically movable device responsive to said pressure, and means connecting said device and said wiper for moving said wiper linearly in response to variations in said pressure, whereby said output voltage varies with said pressure in accordance with said relationship.

2. Apparatus for producing an output voltage which varies non-linearly with dynamic fluid pressure comprising, an autotransformer having primary and secondary turns, a source of input voltage arranged to be connected across said primary turns, means for selecting the number of primary turns connected across said source, and means operating said selecting means to vary the number of primary turns connected across said source in response to variations in said fluid pressure, said selecting means comprising a wiper movable over said primary turns, and said operating means comprising a movable pressure responsive device and a mechanical linkage, said linkage having a shaft, a pair of angularly displaced crank arms secured to said shaft, a rod connecting one of said arms to said device, a member connecting the other of said arms to said wiper, and means for varying the angle between said arms to vary the excursion of said wiper for a predetermined movement of said device.

3. Apparatus in accordance with claim 2, further including means for varying the angle between the axis of said autotransformer and the path of said wiper.

References Cited in the file of this patent
UNITED STATES PATENTS

| | | |
|---|---|---|
| Re. 19,957 | Smith | May 5, 1936 |
| 2,295,303 | St. Palley | Sept. 8, 1942 |
| 2,423,609 | Middleton et al. | July 8, 1947 |
| 2,443,252 | Kelly | June 5, 1948 |
| 2,466,071 | Barnes et al. | Apr. 5, 1949 |
| 2,695,353 | Witschonke | Nov. 23, 1954 |